(12) United States Patent
Liebenow

(10) Patent No.: US 7,136,270 B2
(45) Date of Patent: Nov. 14, 2006

(54) SURGE PROTECTOR INCLUDING DATA PASS-THROUGH

(75) Inventor: Frank Liebenow, Jefferson, SD (US)

(73) Assignee: Gateway Inc., Irvine, CA (US)

( * ) Notice: Subject to any disclaimer, the term of this patent is extended or adjusted under 35 U.S.C. 154(b) by 341 days.

(21) Appl. No.: 10/764,310

(22) Filed: Jan. 23, 2004

(65) Prior Publication Data

US 2004/0156159 A1 Aug. 12, 2004

Related U.S. Application Data

(60) Provisional application No. 60/443,078, filed on Jan. 28, 2003, provisional application No. 60/500,721, filed on Sep. 5, 2003.

(51) Int. Cl.
H02H 9/06 (2006.01)

(52) U.S. Cl. ..................................... 361/118

(58) Field of Classification Search ................ 361/118, 361/119, 120
See application file for complete search history.

(56) References Cited

U.S. PATENT DOCUMENTS

| | | | | |
|---|---|---|---|---|
| 5,386,574 A | * | 1/1995 | Asprey | 710/100 |
| 5,768,113 A | * | 6/1998 | Safraoui | 363/17 |
| 6,181,777 B1 | * | 1/2001 | Kiko | 379/32.04 |
| 6,396,673 B1 | | 5/2002 | Yancey et al. | |
| 6,466,613 B1 | | 10/2002 | Raphaeli et al. | |
| 6,683,531 B1 | * | 1/2004 | Diamanti et al. | 375/258 |
| 6,747,859 B1 | * | 6/2004 | Walbeck et al. | 361/93.1 |
| 2002/0080010 A1 | * | 6/2002 | Zhang | 340/310.06 |
| 2004/0223617 A1 | * | 11/2004 | Corcoran et al. | 380/266 |

FOREIGN PATENT DOCUMENTS

DE 44 03 907 A1 8/1995

OTHER PUBLICATIONS

Pacific Custon Cable Inc., www.pacificcable.com/picture_page.asp?DataName=XPXPPF.
Smarthome—The easiest way to control home automation devices with your pc—www.smarthome.com/1132U.html.

* cited by examiner

Primary Examiner—Brian Sircus
Assistant Examiner—Boris Benenson
(74) Attorney, Agent, or Firm—Ross F. Hunt, Jr.; Stiles & Harbison PLLC

(57) ABSTRACT

A surge suppressor includes a high-pass filter configured to pass signals in the range suitable for use in a powerline network.

20 Claims, 2 Drawing Sheets

SURGE PROTECTOR INCLUDING DATA PASS-THROUGH

This application is related and claims priority to U.S. provisional application No. 60/443,078, filed Jan. 28, 2003, entitled "APPARATUS AND METHODS OF NETWORKING DEVICES, SYSTEMS AND COMPUTERS VIA POWER LINES" and to U.S. provisional application No. 60/500,721, filed Sep. 5, 2003, entitled "SURGE PROTECTOR INCLUDING DATA PASS-THROUGH" the entireties of both of which are incorporated by reference herein, including all of the documents referenced therein.

BACKGROUND OF THE INVENTION

1. Field of the Invention

The present invention relates to devices, systems, and processes useful as surge suppressors, and more specifically to surge suppressors useful in a powerline network.

2. Brief Description of the Related Art

Home Power Line Network Adapters (HPLNA) is a recent advance in networking technology that uses a building's AC power wiring and circuits to also transmit data signals between computing devices. Typical HPLNA networking is done with a module plugged into a wall electrical outlet and then connecting a USB cable (or other type of interface connection) to the computer, e.g. Ethernet. While this type of solution has had some uses, it is not a well integrated solution for systems shipped with networking and requires several user steps in installing.

Surge protectors can be built to work very well, yet this capacity to suppress spikes in a circuit's AC power has negative effects as well. Indeed, many surge suppressors work so well that the frequencies that HPLNA operates at cannot effectively pass through the surge suppressor to the home power grid. Thus, the surge suppressor can have the effect of not making available a HPLNA network to devices plugged into the surge suppressor.

Many other types of electrical adapters have previously been proposed. For example, U.S. Pat. No. 6,373,377 B1 describes a power supply in a personal computer that incorporates a network interface card (NIC). U.S. Pat. No. 5,510,691 and U.S. Pat. No. 5,466,165 describe AC adapters with power conditioning; APC Corp., of West Kingston, R.I. (among others), offers similar devices on the current market. The X10 Home Solutions company offers devices which, according to X10, enable a user to remotely turn on and off devices powered by an AC circuit utilizing an interface that plugs into the AC circuit. Pacific Cable (Bonney Lake and Auburn, Wash.) has offered devices that it characterizes as X10 power suppressors.

There remains a need, therefore, for surge suppressors that pass through powerline network signals while still providing surge suppression functions in AC power grids.

SUMMARY OF THE INVENTION

According to a first aspect of the invention, A surge protector device comprises an input for combined AC power and powerline signals, a surge protection circuit connected to the input, at least one output connected to the surge protection circuit, and a high-pass filter connected between the input and the at least one output configured and arranged such that powerline networking signals can pass through the surge protection device without being attenuated by the surge protection circuit.

According to another aspect of the present invention, a surge protector device comprises power and powerline signal input means, surge protection means connected to the input means, output means connected to said surge protection means, and high-pass means connected between the input and the output for passing powerline networking signals through the surge protection means without being attenuated by the surge protection means.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
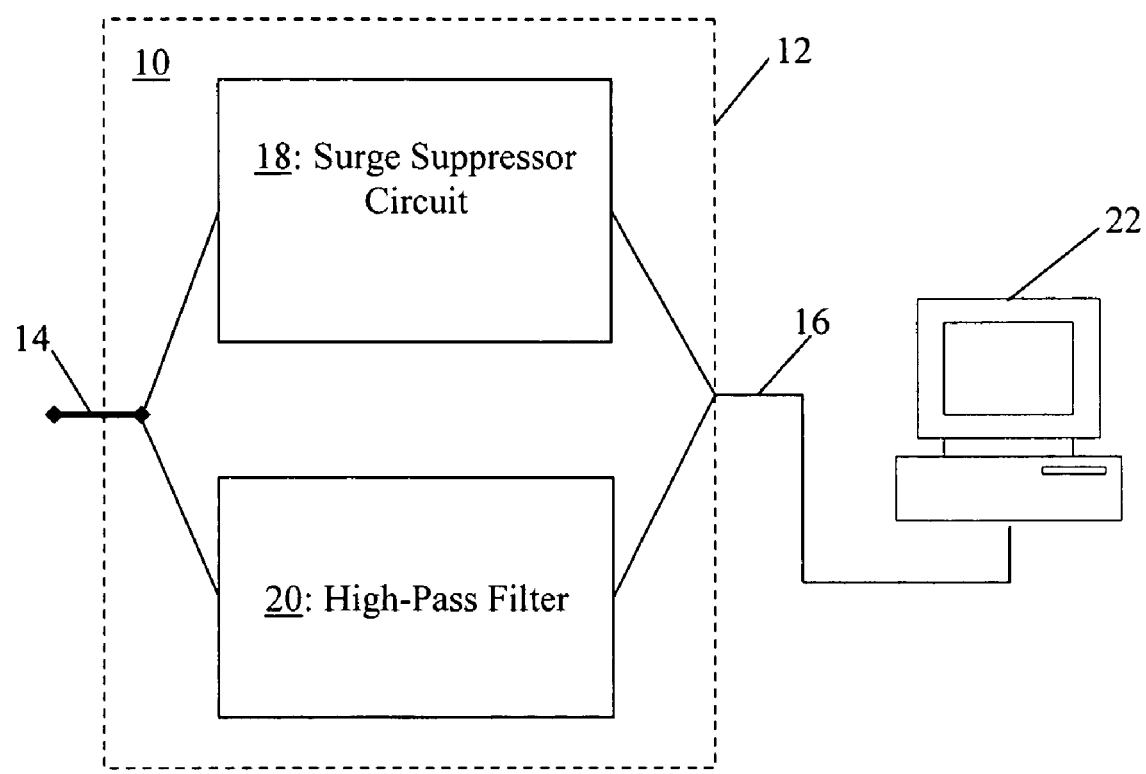
FIG. 1 diagrammatically illustrates a high-level aspect of the present invention.

Referring to the drawing figures, like reference numerals designate identical or corresponding elements throughout the several figures.

In the descriptions herein, a familiarity with powerline data network protocols, being within the knowledge of the skilled artisan, is presumed, as is a familiarity with the build and operation of powerline network adapter circuitry, and in particular the HomePlug specifications (see homeplug.org, and "HomePlug Standard Brings Networking to the Home" by Steve Gardner, Brian Markwalter, and Larry Yonge, incorporated by reference in its entirety herein.), and AC surge suppressor design and construction. Additionally, the aforementioned provisional application describes additional powerline network devices, systems, and methods usable with the present invention.

In general terms, the present invention provide a bypass through or around a surge protector that allows the HPLNA data frequencies to pass through and does not reduce surge protection for devices plugged into it. According to an exemplary embodiment of the present invention, a high-pass filter with high-voltage capacity is coupled to the AC input to the surge protector, e.g., AC power cord input. The high-pass filter is constructed to have very low attenuation at the frequency range in which the powerline data is transmitted, yet voltage spikes from lighting, etc., do not pass through the filter because the spikes or surges are low frequency in nature. As the design and construction of such high voltage high-pass filters is well within the skill of one of ordinary skill in the art, only exemplary embodiments of filters will be described herein so as not to obscure the present invention. Note that although the examples suggest the use of a high-pass filter, any type of filter that offers low impedance at the HPLNA frequencies as well as high voltage protection will work equally as well. An example might be a band-pass filter tuned to the HPLNA frequency range.

Turning now to the drawing figures, FIG. 1 diagrammatically illustrates a high-level aspect of the present invention. A surge suppressor 10 in accordance with the present invention includes a housing or enclosure 12 into which an AC power cord 14 is (typically captively) connected. The housing includes one or more outlet sockets (not illustrated) into which an AC powered machine, e.g., computing device (PC, printer) is plugged via an AC power cord and/or networking cable 16. Preferably, cord and/or cable 16, and/or device 22, includes a powerline networking device that includes logic configured so that the device 22 can send and receive data over a HPLNA network, and more preferably is compliant with the HomePlug specifications. The cord and or cable 16, and/or the device 22 also preferably includes a powerline adapter (not illustrated (that splits the AC power from the powerline network data signal, and makes one or both available to the device 22. As will be readily appreciated by those of ordinary skill in the art, the suppressor 10 can include many outlet plugs into which numerous cables or plugs 16, and therefore numerous devices 22, can be plugged.

The surge suppressor 10 includes at least two circuit units electrically arranged in parallel: a surge suppressor circuit or unit 18; and a high-pass filter unit 20. As described briefly above, the surge suppressor unit 18 can be any of numerous designs that are known to those of ordinary skill in the art, and therefore further details of the unit 18 will not be provided herein. The high-pass filter 20 is arranged in parallel with the unit 18, and is designed to have a frequency response that permits at least the band in which HPLNA operates to transmit and receive data. More specifically, the signal attenuation in the pass band is below a preselected amount (e.g., expressed in dB). More preferably and when used with HPLNA devices, the filter 20 has a maximum signal attenuation in the pass band that meets or exceeds the HomePlug specification.

Figure 2:
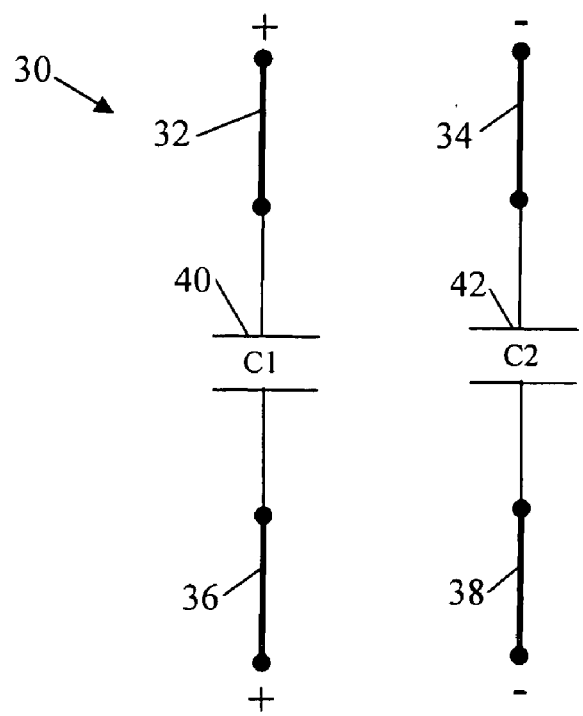
FIG. 2 schematically illustrates an exemplary embodiment in accordance with the present invention.

FIG. 2 schematically illustrates an exemplary embodiment in accordance with the present invention. A filter 30, usable as high-pass filter 20, includes a pair of high-voltage capacitors 40, 42. The capacitors 40, 42 are coupled, each one connecting one rail 32, 34 of the input 14 of the surge protector 10 (e.g., a power cord) to the corresponding rail 36, 38 of the output of the surge protector (e.g., outlet plugs, not illustrated). The capacitors 40, 42 have a capacitance of 0.01 uf and 0.01 uf respectively, that essentially act as a low impedance at the frequencies that are used by HPLNA. More preferably, C1 and C2 are matched, and by way of example and not of limitation, pass signals in the range of about 4 MHz to about 28 MHz. Those of ordinary skill in the art will appreciate that when different frequency ranges are used to transmit data over the powerline, the high-pass filter 20, and in the example of FIG. 2 the capacitors 40, 42, are configured to pass signals in the frequencies used. Yet another aspect of the present invention includes that the capacitors 40, 42, have capacitances of between about 0.1 µf and about 0.001 µf, more preferably between about 0.1 µf and about 0.01 µf, and even more preferably about 0.01 µf.

Another aspect of the present invention is the selection of the capacitors 40, 42. It is preferred for these capacitors to have a very low impedance at the frequencies at which HPLNA operates, e.g., 4 MHz to 28 MHz in the current example. The general equation for capacitor impedance Z is: $Z=1/(2*\pi*f*C)$, where f is frequency in Hertz and C is capacitance in Farads. The capacitor selection should provide high impedance to voltage spikes and AC power and low impedance to the HPLNA frequencies in order to function as a surge suppressor. Furthermore, the capacitor preferably has a rated breakdown voltage of at least 2000V for Grade C surge suppressors, 4000V for Grade B, and 6000V for Grade A. The value of the capacitor is not critical to the present invention so long as it attenuates AC power and spikes, while passing HPLNA frequencies. Using the above equation, a 0.01 uf capacitor will have an impedance of around 4 ohms at 4 MHz and an impedance of around 265K ohms at 60 Hz. A 0.001 uf capacitor will have an impedance of around 40 ohms at 4 MHz and 2,650K ohms at 60 Hz. Therefore, depending on the impedance of the devices being powered through the surge protector at the HPLNA frequencies, a wide range of capacitances may be used. Because 0.01 uf capacitors are readily commercially available in high voltage ratings, they should provide sufficiently low impedance within the HPLNA frequency range and high enough impedance in the range of AC frequency and voltage spikes when used with a 120 volt, 50–60 Hz AC power grid circuit. The 40 ohm impedance of a 0.001 uf capacitor at 4 MHz can be acceptable providing the impedance of the input circuits plugged into the surge suppressor are high enough at the same frequencies, but a preferred value would be 0.01 uf.

Figure 3:
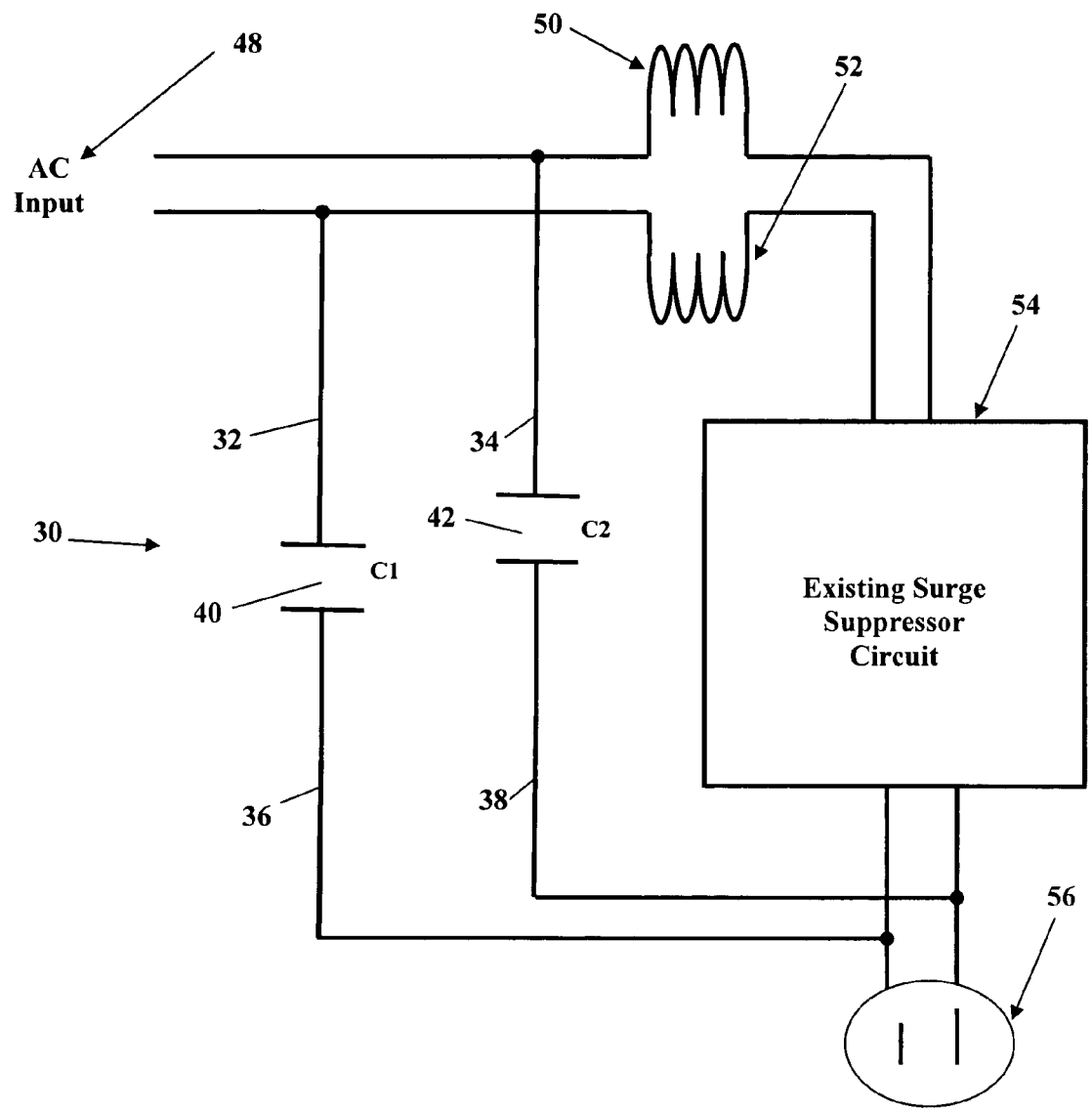
FIG. 3 schematically illustrates an exemplary embodiment in accordance with the present invention.

FIG. 3 schematically illustrates yet another exemplary embodiment in accordance with the present invention. A filter 30, usable as high-pass filter, includes a (preferably matched) pair of high-voltage capacitors 40, 42. The capacitors 40, 42 are coupled, each one connecting one rail 32, 34 of the AC input 48 (e.g., a power cord) to the corresponding rail 36, 38 of the output of the surge protector 56 (e.g., outlet plugs). The capacitors 40, 42 have capacitance 0.01 uf and 0.01 uf, respectively, that essentially act as very low impedance at the frequencies that are used by HPLNA. More preferably, C1 and C2 are matched, and by way of example and not of limitation, pass signals in the range of about 4 MHz to about 28 MHz. Those of ordinary skill in the art will appreciate that when different frequency ranges are used to transmit data over the powerline, the high-pass filter 30, and in the example of FIG. 4, the capacitors 40, 42, are configured to pass signals in the frequencies used.

Yet another aspect of the present invention is the selection of the capacitors 40, 42. It is preferred for these capacitors to have a very low impedance at the frequencies at which HPLNA operate, e.g., 4 MHz to 28 MHz in the current example. The capacitor selection must provide high impedance to voltage spikes and AC power and low impedance to the HPLNA frequencies. Furthermore, the capacitor must have a rated breakdown voltage of at least 2000V for Grade C surge suppressors, 4000V for Grade B, and 6000V for Grade A. The value of the capacitor is not critical to the present invention so long as it attenuates AC power and spikes, while passing HPLNA frequencies. As with the exemplary embodiment described above with reference to FIG. 2, a 0.01 µf capacitor provides sufficiently low impedance within the HPLNA frequency range and high enough impedance in the range of AC frequency and voltage spikes when used with a 120 volt, 50–60 Hz AC power grid circuit. Even the 40 ohm impedance of a 0.001 uf capacitor at 4 MHz can be acceptable providing the impedance of the input circuits plugged into the surge suppressor are high enough at the same frequencies, but a preferred value would be 0.01 uf. Inductors 50 and 52 are also provided, one on each rail of the AC input 48, to provide a high impedance at the HPLNA operating frequencies so that capacitors within the existing surge suppressor circuit 54 do not appreciably attenuate the HPLNA signals. Typical values for inductors 50 and 52 are 0.25 µH with a suggested current rating of 5 amps. Any current ratings may be used depending on the power rating of the surge protector.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A surge protector device comprising:
   an input for combined AC power and powerline signals;
   a surge protection circuit connected to the input;
   at least one output connected to the surge protection circuit; and
   a high-pass filter connected between the input and the at least one output configured and arranged such that powerline networking signals can pass through the surge protection device without being attenuated by the surge protection circuit.

2. A surge protector device in accordance with claim 1, wherein the input has at least two rails, the at least one output has at least two rails, and wherein the high-pass filter is connected between one rail of the input and one rail of the at least one output.

3. A surge protector device in accordance with claim 2, wherein the input includes two rails, each of the at least one output has two rails, and the high-pass filter is connected between both rails of the input and both rails of each of the at least one output.

4. A surge protector device in accordance with claim 1, wherein the high-ass filter comprises two capacitors connected in parallel.

5. A surge protector device in accordance with claim 4, wherein the capacitance of each of said capacitors is between about 0.001 uf and about 0.1 uf.

6. A surge protector device in accordance with claim 5, wherein the capacitance of each of said capacitors is between about 0.1 uf and 0.001 uf.

7. A surge protector device in accordance with claim 6, wherein the capacitance of each of said capacitors is about 0.01 uf.

8. A surge protector device in accordance with claim 1, further comprising:
   a housing, the high-pass filter and the surge protection circuit being disposed in the housing.

9. A surge protector device in accordance with claim 1, further comprising:
   a power line network adapter electrically connected downstream of the at least one output.

10. A surge protector device in accordance with claim 1, further comprising:
    at least one inductor connected between the input and the surge protection circuit to increase impedance at a powerline networking operating frequency.

11. A surge protector device comprising:
    power and powerline signal input means;
    surge protection means connected to the input means;
    output means connected to said surge protection means; and
    high-pass means connected between the input means and the output means for passing powerline networking signals through the surge protection means without being substantially attenuated by the surge protection means.

12. A surge protector device in accordance with claim 11, wherein the high-pass means comprises two similar capacitors connected in parallel.

13. A surge protector device in accordance with claim 12, wherein the capacitance of each of said capacitors is between about 0.001 uf an about 0.1 uf.

14. A surge protector device in accordance with claim 13, wherein the capacitance of each of said capacitors is between about 0.001 uf and about 0.01 uf.

15. A surge protector device in accordance with claim 14, wherein the capacitance of each of said capacitors is about 0.01 uf.

16. A surge protector device in accordance with claim 11, wherein the input means comprises at least two rails, the output means comprises at least two rails, and wherein the high-pass means is connected between one rail of the input means and one rail of the output means.

17. A surge protector device in accordance with claim 16, wherein the input means includes two rails, the output means has two rails, and the high-pass means is connected between at least one rail of the input means and at least one rail of the output means.

18. A surge protector device in accordance with claim 11, further comprising:
    an enclosure, the high-pass means and surge protection means being disposed in the enclosure.

19. A surge protector device in accordance with claim 11, further comprising:
    a powerline network adapter electronically connected downstream of the output means.

20. A surge protector device in accordance with claim 11, further comprising:
    an inductor means connected to the input means to increase impedance at a powerline networking operating frequency.

* * * * *